US012229694B2

United States Patent
Pandith et al.

(10) Patent No.: US 12,229,694 B2
(45) Date of Patent: Feb. 18, 2025

(54) TOUCH-FREE CHECK-IN KIOSK

(71) Applicant: Rockwell Collins, Inc., Cedar Rapids, IA (US)

(72) Inventors: Seetharam Pandith, Bangalore (IN); Ajay Nagonda Nagarajan, Madurai (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 45 days.

(21) Appl. No.: 17/563,477

(22) Filed: Dec. 28, 2021

(65) Prior Publication Data
US 2022/0230099 A1 Jul. 21, 2022

(51) Int. Cl.
H04W 4/00 (2018.01)
G06Q 10/00 (2023.01)
G06Q 10/02 (2012.01)
H04W 4/80 (2018.01)

(52) U.S. Cl.
CPC .............. G06Q 10/02 (2013.01); H04W 4/80 (2018.02)

(58) Field of Classification Search
None
See application file for complete search history.

(56) References Cited

U.S. PATENT DOCUMENTS

| 7,086,591 | B2 | 8/2006 | Anderson | |
|---|---|---|---|---|
| 7,206,559 | B2 | 4/2007 | Meade | |
| 9,165,265 | B2 | 10/2015 | Gilbert et al. | |
| 9,274,742 | B2 | 3/2016 | Phillips | |
| 2002/0049620 | A1* | 4/2002 | Uchida | G06Q 10/02 705/5 |
| 2004/0193313 | A1* | 9/2004 | Cornet | G06Q 30/02 700/231 |
| 2005/0265503 | A1* | 12/2005 | Rofheart | H04W 28/18 375/150 |
| 2010/0153144 | A1* | 6/2010 | Miller | G06Q 10/02 707/769 |
| 2012/0170728 | A1 | 7/2012 | Wengrovitz et al. | |

(Continued)

FOREIGN PATENT DOCUMENTS

| EP | 2833302 A1 | 2/2015 |
|---|---|---|
| GB | 2568120 A | 5/2019 |
| WO | 2020128778 A1 | 6/2020 |

OTHER PUBLICATIONS

Passenger Terminal Today, "Why contactless technology is key to rebuilding passenger confidence" (Year: 2020).*

(Continued)

Primary Examiner — Tonya Joseph
(74) Attorney, Agent, or Firm — Suiter Swantz IP

(57) ABSTRACT

A contact-less check-in system is disclosed. The system includes a kiosk that includes a housing, a display, and a communication module. The system further includes one or more processors and a memory with instructions stored within instructing the kiosk to receive input signals from a user device, transmit display signals to the display based on the input signals, and perform one or more business functions based on the input signals. The communication module may be configured to communicate with the user device via IEEE 802 protocols or infrared signals. A method to convert a contact-required check-in system to a contact-less check-in system in also disclosed.

9 Claims, 5 Drawing Sheets

(56) References Cited

U.S. PATENT DOCUMENTS

| | | | |
|---|---|---|---|
| 2012/0203572 A1* | 8/2012 | Christensen | G06Q 30/02 |
| | | | 705/2 |
| 2013/0275875 A1* | 10/2013 | Gruber | G06F 3/167 |
| | | | 715/728 |
| 2014/0006451 A1 | 1/2014 | Mullis et al. | |
| 2014/0358594 A1 | 12/2014 | Antonakakis | |
| 2016/0027132 A1* | 1/2016 | Craparo | G06Q 50/12 |
| | | | 705/15 |
| 2019/0138949 A1 | 5/2019 | Malinofsky et al. | |
| 2021/0350346 A1* | 11/2021 | Edwards | G06Q 20/1085 |
| 2022/0101469 A1* | 3/2022 | D'Souza | H04L 9/0894 |

OTHER PUBLICATIONS

Extended Search Report in European Application 22152111.5 dated May 31, 2022, 15 pages.

\* cited by examiner

TOUCH-FREE CHECK-IN KIOSK

REFERENCE TO RELATED APPLICATIONS

This application claims the benefit of priority under 35 U.S.C. § 119(e) to Indian Provisional Patent Application No. 202141002257 entitled "TOUCH-ME-NOT-KIOSK" filed Jan. 18, 2021, the entirety of which is hereby incorporated by reference herein.

BACKGROUND

Many airports and airlines use contactless check-in systems that allow travelers to submit information identifying them as passengers for upcoming flights, and to print-out boarding passes, baggage tags, or other information relevant to their flight. Although useful for reducing the spread of viruses and other agents via the reduction in person-to-person contact, contactless check-in systems have various drawbacks. For example, contactless "kiosks" are each typically tailored for specific airlines and multiple contact-less kiosks within an airport may each require a special application within a passenger's cell phone or tablet to access information. Additionally, some contactless kiosks are activated/operated by a person's gaze or profile. These head-sensing kiosks demand high user concentration and patience, which increase overall time that a passenger spends at each kiosk. The transition of traditional check-in kiosks to either contactless or head-sensing kiosks require major hardware and software updates that are labor and cost intensive.

Therefore, it is desirable to provide a system or method that avoids the shortcomings of conventional approaches.

SUMMARY

A contact-less check-in system is disclosed. In one or more embodiments, the contact-less check-in system includes a kiosk. In one or more embodiments, the kiosk includes a housing. In one or more embodiments, the kiosk includes a display. In one or more embodiments, the kiosk further includes a communication module. In one or more embodiments, the kiosk further includes a controller communicatively coupled to the communication module and the display. In one or more embodiments, the controller includes one or more processors. In one or more embodiments, the controller further includes a memory with instructions stored upon that are executed by the one or more processors. In one or more embodiments, the instructions include receiving input signals from a user device. In one or more embodiments, the instructions include transmitting one or more display signals to the display based on the input signal. In one or more embodiments, the instruction includes performing one or more business functions based on the input signals.

In some embodiments of the contact-less check-in system, at least one of the display or the housing originate from a contact-required check-in system.

In some embodiments of the contact-less check-in system, the display is configured as a touchscreen display, wherein a touch function of the touchscreen may be deactivated based on an administrative input In some embodiments of the contact-less check-in system, the communication module is configured to perform wireless IEEE 802 protocols to facilitate communication between the kiosk and the user device.

In some embodiments of the contact-less check-in system, the communication module is configured to determine if the user device is configured in an access position.

In some embodiments of the contact-less check-in system, the input signal is configured as an infrared signal.

In some embodiments of the contact-less check-in system, the contact-less check-in system further includes a printer configured to print at least one of a boarding pass or baggage tag based upon the one or more input signals.

In some embodiments of the contact-less check-in system, a soft copy of a boarding pass is downloaded to the user device based on the one or more input signals.

In some embodiments of the contact-less check-in system, the contact-less check-in system is configured to access biometric data from the user device.

In some embodiments of the contact-less check-in system, the user device comprises a fingerprint scanner, wherein the contact-less check-in system can access the fingerprint scanner.

In some embodiments of the contact-less check-in system, the user device is configured to download and execute an application from the contact-less check-in system, wherein the application enables the user device to access the contact-less check-in system.

In some embodiments of the contact-less check-in system, the application is configured to facilitate communication between the user device with kiosks from different airlines and having different graphical user interfaces.

A method for converting a contact-required check-in kiosk to a contact-less check-in kiosk is also disclosed. In some embodiments, the method includes installing hardware into the contact-required check-in kiosk, wherein the hardware is configured to facilitate a reception of input signals from a user device. In some embodiments, the method further includes installing software into the contact-required check-in kiosk, wherein the software comprises instructions stored into memory that is executed by one or more processors. In some embodiments, the instructions include receiving the input signals from the user device via the hardware. In some embodiments, the instructions include transmitting one or more display signals to a kiosk display transmit one or more display signals to the display based on the input signals. In some embodiments, the instructions include performing one or more business functions based on the input signals.

In some embodiments of the method, the hardware is configured to facilitate communication between the contact-required kiosk and the user device via wireless IEEE 802 protocols.

In some embodiments of the method, the hardware is configured to facilitate IR communication between the contact-required kiosk and the user device.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
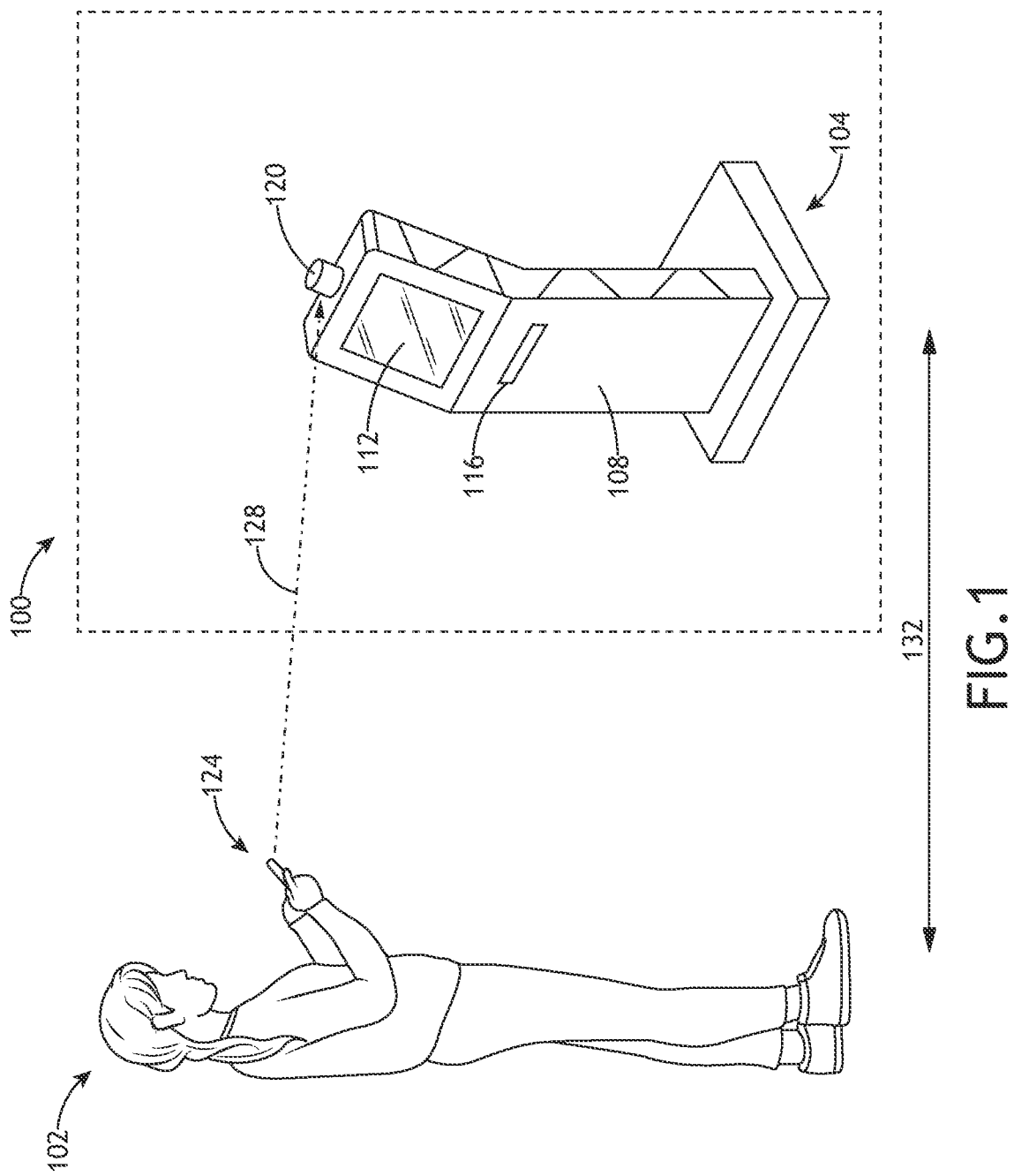
FIG. 1 is a drawing illustrating a system for contact-less check-in shown being used by a customer, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A contact-less check-in system is disclosed. The system is a configured as a kiosk that facilitates checking in of customers/users (e.g., passengers) without the need to touch the any part of the kiosk, including the display, utilizing the customer's user device, such as a smart phone. The system may use or infrared technologies to communicate between the kiosk and the user device. The system may utilize legacy or traditional touch-required kiosks that have been modified via hardware and software updates to add touch-less capabilities.

FIG. 1 is a drawing illustrating a system 100 for contact-less check-in shown being used by a customer 102 (e.g., user), in accordance with one or more embodiments of the disclosure. The system includes a kiosk 104 configured with a housing 108. The kiosk 104 may be configured for any type of check-in or identification use. For example, the kiosk 104 may be an airport kiosk that facilitates the checking in of passengers before flights. For instance, the kiosk 104 may be configured to print of boarding passes and/or baggage tags for commercial air flights. In another example, the kiosk may be configured as a check-out kiosk at a store, such as a grocery store or convenience store, or goods store, or any other business or organization that requires a user's identification for checking out. In another example, the kiosk may be configured as a check-in kiosk for services. For instance, the kiosk may be configured as a check-in kiosk for a hospital, a clinic, a library, a secure building, or any building or structure that requires an identification of a user for entry.

In some embodiments, the kiosk 104 includes one or more displays 112 configured to display information to the user, and facilitate the input of user information into the system 100. For example, the display may display relevant flight information to a passenger. The display may be configured as any type of display, including but not limited to cathode ray tube displays, flat panel displays, and touchscreens.

The kiosk 104 may further include or be communicatively coupled to a printer 116. For example, the printer 116 may print out boarding passes and baggage tags based on the input provided by the customer 102.

In embodiments, the kiosk 104 further includes a communication module 120 communicatively coupled to the kiosk 104 and configured to facilitate communication with a user device 124 being used by the customer 102 via a signal 128. The communication module 120 includes hardware (e.g., electronic circuitry) software and/or firmware that enable the kiosk 104 to receive data from the customer 102. The communication module 120 may include any type of wireless communication technology (e.g., hardware, software, or firmware). For example, the communication module 120 may include communication technology configured to performing WIRELESS IEEE 802 protocols including but not limited to WIFI, Bluetooth, BLE, WiMAX, and ZigBee. For instance, the communication module 120 may include a Bluetooth-enabled transceiver allowing direct communication between the kiosk 104 and the user device 124. In another instance, the communication module 120 may include a WIFI-enabled transceiver that communicates with the user device 124 through a router. The user device 124 may include any communication device including but not limited to a cell phone, a tablet, or a compute (e.g., such as a laptop computer).

In some embodiments, the communication module 120 may include communication technology configured to perform infrared (IR) based communication. For example, the communication module 120 may include an IR receiver configured to receive IR signals from a user device, such as cell phone configured with an infrared blaster (e.g., IR blaster), or a smart remote. For instance, a cell phone utilizing the IR blaster may be configured to access a displayed screen on the display by executing a downloadable application (e.g., an IR blaster application). Using the IR blaster application, the customer 102 may navigate through various screens within a graphical user interface (GUI) of the display 112, and input data into input boxes within the GUI (e.g., name, address, destination) though virtual or physical keys of the user device 124.

The user device 124 may also navigate through the GUI of the display 112 via an application configured for wireless IEEE 802-based communication. For example, a downloadable and executed application may facilitate the user device 124 to send data directly to the communication module 120, where the display 112 is then updated based on the input data. The application may also send a real-image of the display 112 to the screen of the user device 124 (e.g., mirror casting). In this manner, the customer 102 may need only look at the screen of the user device 124 to control and see the information displayed on the display 112. IR blasting and mirror casting both can be accomplished in existing kiosks that require the touch of a customer via software/firmware updates and relatively low-cost hardware updates.

In some embodiments, the system 100 via is configured to facilitate communication between the user device 124 and different kiosks 104 from different airlines via a single application. For example, for many airline kiosks, software that correlates the pressing of a key on a virtual keyboard on a kiosk touchscreen with a letter or number is not considerably different between different airlines, and many kiosk vendors use similar software for general operation of touchscreens. Therefore, an application downloaded onto a user device 124 may be configured to control kiosks from different airlines that use similar kiosk technology.

In some embodiments, the system 100 is configured to determine whether the customer 102 is in an access position 132 from the kiosk 104. For example, in crowded terminals with multiple kiosks 104, the system 100 may determine the relative position of the customer 102 to the kiosk 104 as a way of assuring that the correct customer 102 is using the correct kiosk 104 (e.g., the customer is at an access position 132). The system may use any method for determining the position of the customer 102 including but not limited to the use of wireless IEEE 802 protocols. For example, the kiosk 104 may utilize a Bluetooth or BLE protocol to communicate with the user device 124 to assure that the customer 102 is within approximately 10 meters of the kiosk 104. In another example, the kiosk 104 may be configured to know its location, or determine its location via access a global navigation satellite system (GNSS), which upon communication with the position data available on the user device 124, would be able to determine the relative position of the kiosk 104 to the user device. Alternatively, the kiosk 104 may be configured to allow a customer to access the kiosk remotely (e.g., not in the immediate area), and download a virtual boarding pass. Therefore, the above description should not be interpreted as a limitation on the embodiments of the present disclosure but merely as an illustration.

Figure 2:
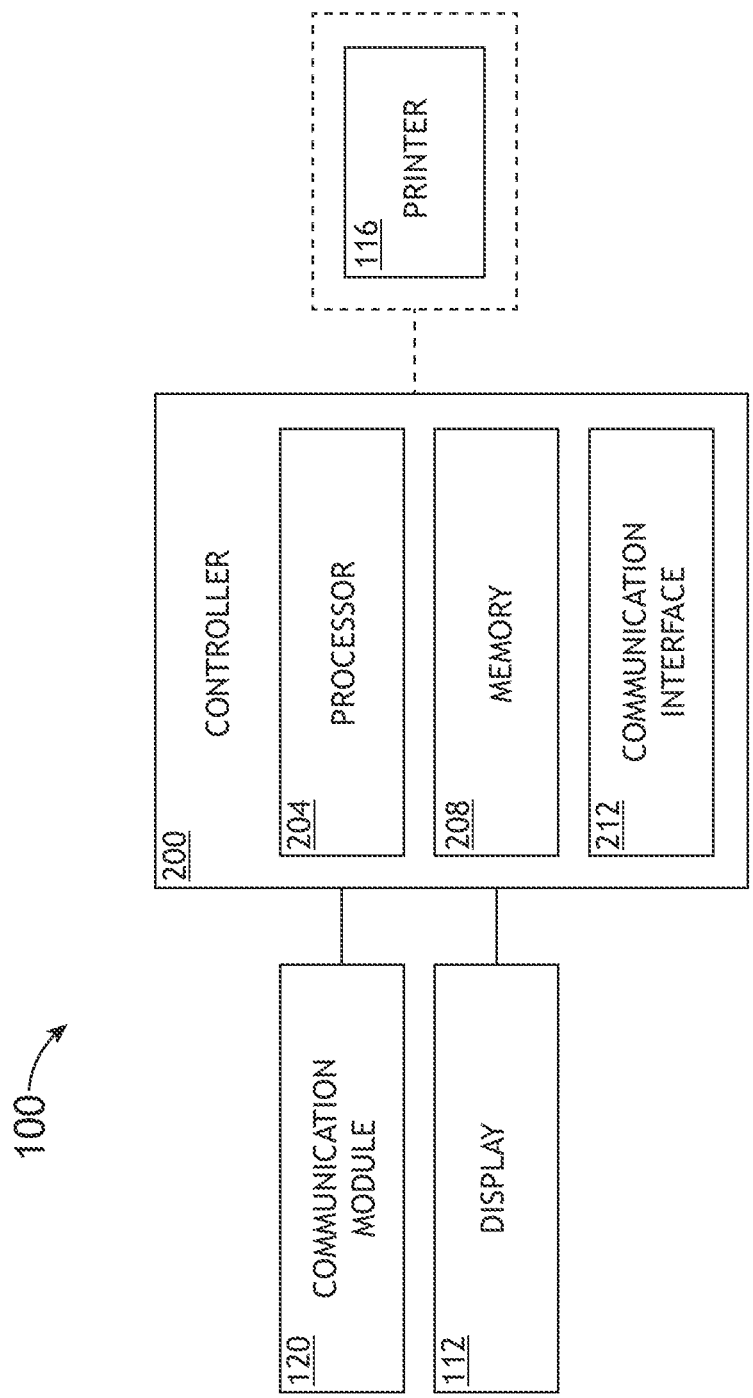
FIG. 2 is a block diagram illustrating electrical components of the system 100, in accordance with one or more embodiments of the disclosure.

FIG. 2 is a block diagram illustrating electrical components of the system 100, in accordance with one or more embodiments of the disclosure. The system also includes a controller 200 communicatively coupled to one or more components of the system 100 (e.g., the display 112, the communication module 120 and/or printer 116), and configured to perform the functionality described within. The controller 216 may include one or more processors 204, memory 208, and a communication interface 212.

The one or more processors 204 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 204 may include any device configured to execute algorithms and/or instructions (e.g., program instructions stored in memory). In one embodiment, the one or more processors 204 may be embodied as a desktop computer, mainframe computer system, workstation, image computer, parallel processor, networked computer, or any other computer system configured to execute a program configured to operate or operate in conjunction with the system 100, as described throughout the present disclosure. Moreover, different subsystems of the system 100 may include a processor or logic elements suitable for carrying out at least a portion of the steps described in the present disclosure. Therefore, the above description should not be interpreted as a limitation on the embodiments of the present disclosure but merely as an illustration.

The memory 208 can be an example of tangible, computer-readable storage medium that provides storage functionality to store various data and/or program code associated with operation of the controller 200 and/or other components of the system 100, such as software programs and/or code segments, or other data to instruct the controller and/or other components to perform the functionality described herein. Thus, the memory can store data, such as a program of instructions for operating the system 100 or other components. It should be noted that while a single memory 208 is described, a wide variety of types and combinations of memory 208 (e.g., tangible, non-transitory memory) can be employed. The memory can be integral with the controller, can comprise stand-alone memory, or can be a combination of both. Some examples of the memory 208 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 212 can be operatively configured to communicate with components of the controller 200 and other components of the system 100. For example, the communication interface 212 can be configured to retrieve data from the controller 200 or other components, transmit data for storage in the memory 208, retrieve data from storage in the memory 208, and so forth. The communication interface 212 can also be communicatively coupled with controller 200 and/or system elements to facilitate data transfer between system components.

Figure 3:
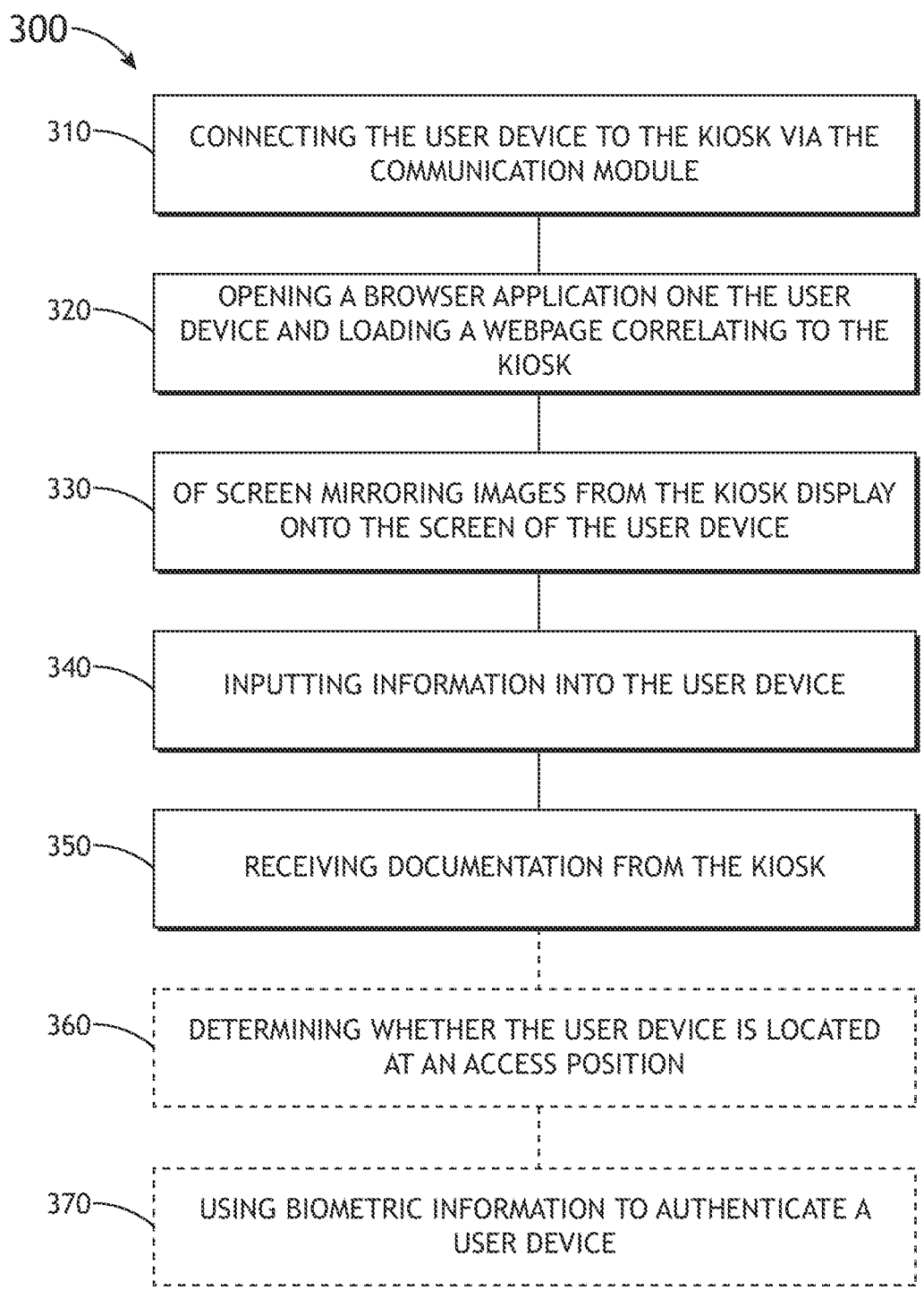
FIG. 3 is a block diagram of a method for receiving check-in documentation from a contact-less kiosk via wireless IEEE 802 protocols, in accordance with one or more embodiments of the disclosure.

FIG. 3 is a block diagram of a method 300 for receiving check-in documentation from a contact-less kiosk via wireless IEEE 802 protocols, in accordance with one or more embodiments of the disclosure. The check-in documentation may include any type of information transmitted to a customer after the customer has presented identification credentials including but not limited to boarding passes, baggage tags, bank accounts data, subscription data, and purchase data.

In some embodiments, the method 300 includes a step 310 of connecting the user device 124 to the kiosk 104 via the communication module 120. For example, the customer 102 may connect to the kiosk 104 via a network connection. For instance, the customer 102 may connect to the kiosk 104 via a WIFI network connection specific for the kiosk 104. The customer 102 may need to be located in and access position 132 relative to the kiosk (e.g., for retrieving a printed information from the printer 116), or may not need to be in close vicinity with the kiosk 104 (e.g., for downloading a virtual boarding pass.

In one or more embodiments, the method 300 further includes a step 320 of opening a browser application one the user device 124 and loading a webpage correlating to the kiosk 104. For example, once a link between the user device 124 and the kiosk 104 has been established the user device 124 may be prompted automatically or by a user to open a browser application and load a webpage corresponding to the kiosk 104. The browser application may be a common application used by the customer 102, or a kiosk-specific browser application. The user device 124 may also and initially be prompted to download a kiosk-specific application and/or open the kiosk-specific application.

In one or more embodiments, the method 300 further includes a step 330 of screen mirroring images from the kiosk display 112 onto the screen of the user device 124. For example, the check-in screen of an airline kiosk display 112 may be casted over to the user device 124. Wireless screen mirroring may be accomplished using various hardware devices from various vendors including but not limited to Wireless Display (WiDi), vended by the Intel Corporation, Airplay, vended by the Apple Inc., Miracast (e.g., also known as SmartShare, AllShare Cast, Screen Mirroring, and Display Mirroring), and Chromecast, vended by Google LLC. Wireless screen mirroring may be accomplished using various software solutions including but not limited to AirServer, Reflector, and AirBeam.

In one or more embodiments, the method 300 further includes a step 340 of inputting information into the user device 124. For example, once the check-in screen of the display 112 appears on the screen of the user device 124, information (e.g., name, identification number, or flight number) may be inputted onto the user device 124 by the customer 102. This information may then be updated simultaneously on the display 112.

In one or more embodiments, the method 300 further includes a step 350 of receiving documentation from the kiosk 104. The documentation may include any type of information including but not limited to a boarding pass or a baggage tag. The documentation may be printed out via the printer 116 or downloaded onto the user device 124 (e.g., as a digital file, or soft copy).

In one or more embodiments, the method 300 may further includes a step 360 of determining whether the user device 124 is located at an access position 132. As described herein, IEEE 802 waveforms (e.g., WIFI, Bluetooth) may be used to locate the position of the user device 124, and determine if the position of the user device 124 is at the access position 132 (e.g., a position that assists in confirming that a specific user device 124 is near a specific kiosk 104. Determining an access position may prevent a user device 124 from accessing an incorrect kiosk 104, particularly if there are several kiosks 104 within a small space.

In one or more embodiments, the method 300 may further include a step 370 of using biometric information to authenticate a user device 124. For example, the kiosk 104 via the communication module 120 and the application on the user device 124 may be able to access a fingerprint sensor (e.g., fingerprint scanner) on the user device 124. The kiosk 104 may then request that the customer 102 scan their finger suing the fingerprint sensor, for which resultant scan is compared to a known scan of the customer's fingerprint to confirm identification.

The step 370 may use other forms of biometric information to authenticate a user device using cameras on either the kiosk 104 or the user device 124 to take photos that are then compared to a known scan. Biometric information retrieved by the system 100 may include but not be limited to handprints, retinal scans, and facial recognition data.

Figure 4:
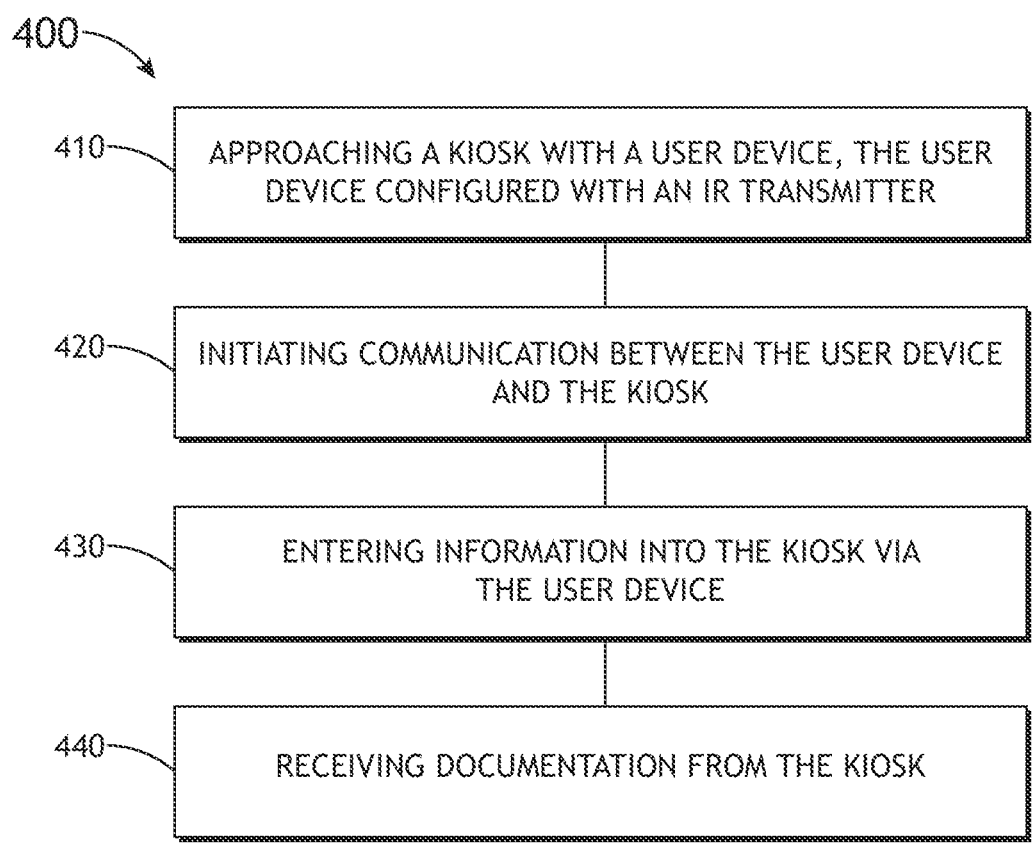
FIG. 4 is a block diagram of a method for receiving check-in documentation from a contact-less kiosk through an IR transmitter, in accordance with one or more embodiments of the disclosure.

FIG. 4 is a block diagram of a method 400 for receiving check-in documentation from a contact-less kiosk through an IR transmitter (e.g., IR blaster), in accordance with one or more embodiments of the disclosure. The check-in documentation may include any type of information transmitted to a customer after the customer has presented identification credentials including but not limited to boarding passes, baggage tags, bank accounts data, subscription data, and purchase data.

In some embodiments, the method 400 includes a step 410 of approaching the kiosk 104 with the user device, the user device 124 configured with an IR transmitter. IR transmitters (e.g., IR blasters) are incorporate into the cell phones and other mobile devices (e.g., Xiaomi phones and some Android devices). Dedicated IR blaster devices are also available that can connect to mobile phones (e.g., via the audio jack). The distance between the user device 124 and the kiosk 104 must be short enough to allow an IR receiver on the kiosk 104 to competently receive the IR signal from the IR transmitter on the user device 124. The IR transmitter on the user device 124 may be configured to communicate with the IR receiver on the kiosk 104 at any distance including but not limited to 0.25 meters, 0.5 meters, 1 meter, two meters, three meters, five meters, or ten meters.

In some embodiments, the method 400 includes a step 420 of initiating communication between the user device 124 and the kiosk 104. For example, upon receiving an IR signal from the IR transmitter, the IR receiver on the kiosk 104 (e.g., as part of the communication module 120) initiates a communication protocol (e.g., executes a software program) granting the user device 124 access to the kiosk 104, including the display 112. Initiating communication may also require downloading an application onto the user device 124 that facilitates communication with the kiosk 104. The application may be previously downloaded (e.g., via airport WIFI or other sources), may be downloaded directly via an IEEE 802-type signal transmitted from the kiosks, or may be triggered to be downloaded via an IEEE 802-type signal from the kiosk or other site based on an initiating IR signal from the user device 124 that is received by the kiosk 104.

In some embodiments, the method 400 includes a step 430 of entering information into the kiosk 104 via the user device 124. For example, once access has been granted to the user device 124, a user may remotely move a cursor on the display 112 to a region of interest (e.g., via navigation keys designated on the user device 124), such as to an entry blank.

The customer 102 may then key in information into the entry blank using the keypad on the user device 124.

In some embodiments, the method 400 includes a step 440 of receiving documentation from the kiosk 104. The documentation may include any type of information including but not limited to a boarding pass or a baggage tag, which may be printed out via the printer 116. The method may also include steps of determining whether the user device is located at and access position 132 or using biometric information to authenticate a user device 124 as described above.

Figure 5:
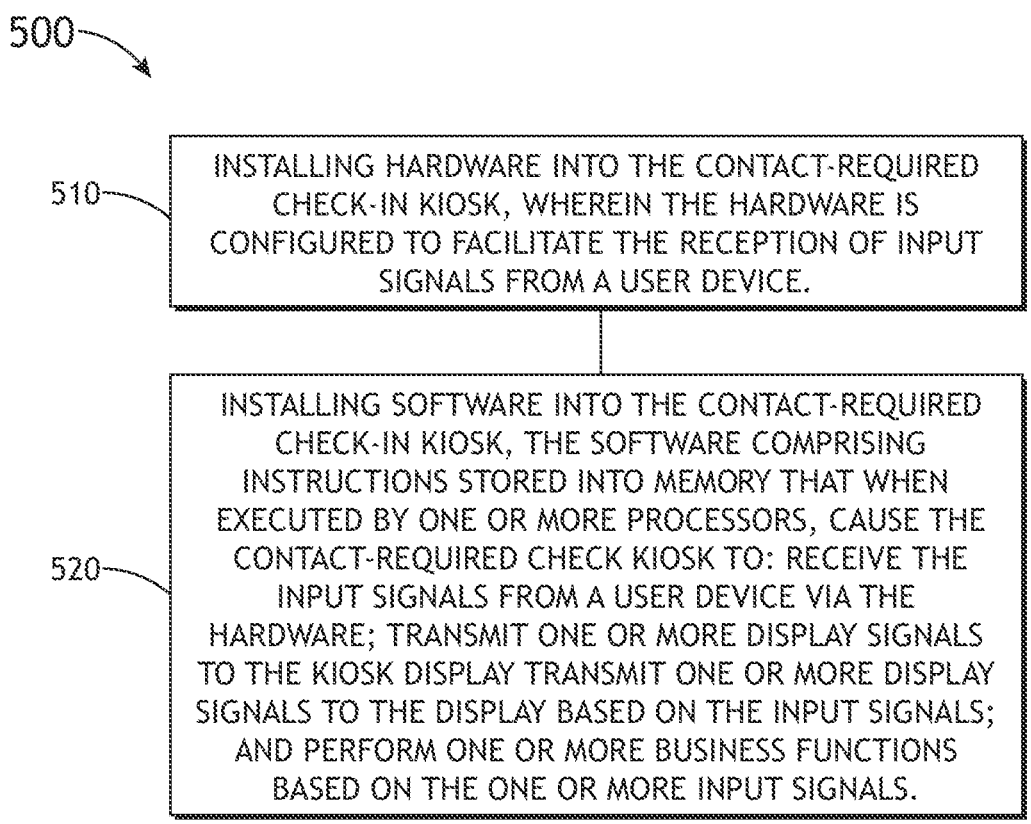
FIG. 5 is a block diagram of a method for converting a contact-required check-in kiosk to a contact-less check-in kiosk in accordance with one or more embodiments of the disclosure.

FIG. 5 is a block diagram of a method 500 for converting a contact-required check-in kiosk (e.g., a kiosk 104 that requires human contact for operation) to a contact-less check-in kiosk 104 in accordance with one or more embodiments of the disclosure. Kiosks 124 in airports and other settings are relatively expensive to purchase and install. Therefore, replacement of an entire older, contact-required check-in kiosk with an entirely new, contact-less check-in kiosk 104 may be undesirable. Converting an older, contact-required check-in kiosk to a contact-less check-in kiosk 104 (e.g., keeping the display, housing and/or other components of the older, contact-required check-in kiosk), may save incur less labor and cost inputs.

In some embodiments, the method 500 includes a step 510 of installing hardware into the contact-required check-in kiosk, wherein the hardware is configured to facilitate the reception of input signals from a user device 124. For example, a WIFI transceiver or other IEEE 802-related component may be installed into the contact-required kiosk and configured to communicate with the user device 124. Installation of a WIFI transceiver/IEEE 802-related component into the contact-required kiosk may involve plugging in or otherwise connecting a WIFI transceiver/IEEE 802-related component, a daughterboard or card containing a WIFI transceiver/IEEE 802-related component, or a motherboard containing a WIFI transceiver/IEEE 802-related component to the electronic circuitry of the kiosk 104. In another example, an IR receiver may be installed into the contact-required kiosk that is configured to communicate with the user device 124. Installation of the IR receiver into the Kiosk 104 may include plugging in or otherwise connecting an IR receiver, a daughterboard or card containing an IR receiver, or a motherboard containing an IR receiver to the electronic circuitry of the kiosk 104.

In some embodiments, the method 500 includes a step 520 of installing software into the contact-required check-in kiosk. The software comprises instructions stored into memory that when executed by one or more processors, cause the contact-required check kiosk to perform several tasks. For example, the instruction may include receiving input signals from a user device 124 via the hardware. For instance, the instruction may include receiving a WIFI signal or IR signal that originated from the user device 124. In another example, the instruction may include transmitting one or more display signals to the kiosk display 112 based upon the input signals. For instance, the WIFI or IR input received by the kiosks may result in a change in the imagery displayed on the display 112, such as the inputting of a name in a query box. In another example, the instruction may include performing one or more business functions based on the one or more input signals. For instance, one a name is entered into the query box, a click onto the screen display 112, initiated by the user device, may result in the printing out of a boarding pass. Other business functions may include printing of a baggage tag, making reservations, purchasing an item, or other functions as described herein.

In some embodiments, the contact-less check-in system 100 may be configured to convert back to a contact-required check-in system. For example, the kiosk 104 may be configured as a contact-less check-in system during a pandemic, then be converted to a contact-required system once the pandemic has subsided. The conversion of the contact-less check-in system 100 to the contact-required check-in system may be executed via a software change or an input within a software program. For instance, an administrator of the contact-less check-in system 100 may be able to activate the conversion of the kiosk 104 (e.g., contact-less check-in system 100 to the contact-required check-in system and vice-versa) via an administrative input. For instance, an administrator input may toggle the display 112 from a touchscreen to a remote-activated screen (e.g., deactivating the touch function of the touch screen) and vice-versa. In another example, the contact-less aspects of the contact-less check-in system 100 may be removed from the kiosk 104 by unplugging or removing an electronic component, such as a dongle.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A contact-less check-in system comprising:
   a kiosk comprising:
      a housing;
      a display configured to display check-in screen images, wherein the display is configured as a touchscreen display, wherein the touchscreen display is configured to be deactivated based on an administrative input, wherein the contact-less check-in system is configured to be converted to a contact-required system;
      a printer configured to print boarding passes;
      a communication module; and
      a controller communicatively coupled to the communication module and the display comprising:
         one or more processors; and
         a memory with instructions stored therein that when executed by the one or more processors, cause the controller to:
            screen mirror the check-in screen images to a user device;
            receive input signals from the user device;
            transmit one or more display signals to the display based on the input signals;

execute a check-in application in the kiosk to perform a check-in operation for a flight passenger based on the input signals and an access position, wherein the check-in application comprises printing a boarding pass based on the input signals and the access position; and allow a soft copy of a boarding pass to be downloaded by the user device based on the input signals, wherein the communication module is configured to perform wireless IEEE 802 protocols to facilitate communication between the kiosk and the user device, wherein the communication module is configured to determine if the user device is located in the access position based on IEEE 802 waveforms of the wireless IEEE 802 protocols.

2. The contact-less check-in system or claim 1, wherein at least one of the display or the housing originate from a contact-required check-in system.

3. The contact-less check-in system of claim 1, wherein the input signals are configured as an infrared signal.

4. The contact-less check-in system of claim 1, wherein the contact-less check-in system is configured to access biometric data from the user device.

5. The contact-less check-in system of claim 1, wherein the user device comprises a fingerprint scanner, wherein the contact-less check-in system can access the fingerprint scanner.

6. The contact-less check-in system of claim 1, wherein the user device is configured to download and execute an application from the contact-less check-in system, wherein the application enables the user device to access the contact-less check-in system.

7. The contact-less check-in system of claim 6, wherein the application is configured to facilitate communication between the user device with kiosks from different airlines and having different graphical user interfaces.

8. A method for converting a contact-required check-in kiosk to a contact-less check-in kiosk comprising:

installing hardware into the contact-required check-in kiosk, wherein the hardware is configured to facilitate a reception of input signals from a user device; and installing software into the contact-required check-in kiosk, wherein the software comprises instructions stored into memory that when executed by one or more processors, cause the contact-required check-in kiosk to:

screen mirror check-in screen images to the user device;

receive the input signals from the user device via the hardware;

transmit one or more display signals to a display based on the input signals;

execute a check-in application in the kiosk to perform a check-in operation for a flight passenger based on the input signals and an access position, wherein the check-in application comprises printing a boarding pass based on the input signals and the access position; and allow a soft copy of a boarding pass to be downloaded by the user device based on the input signals, wherein the display is configured as a touchscreen display, wherein the touchscreen display is configured to be deactivated based on an administrative input and wherein the contact-less check-in kiosk is configured to be converted to a contact-required check-in kiosk;

wherein the hardware is configured to facilitate communication between the kiosk and the user device via wireless IEEE 802 protocols, wherein a communication module is configured to determine if the user device is located in the access position based on IEEE 802 waveforms of the wireless IEEE 802 protocols.

9. The method of claims 8, wherein the hardware is configured to facilitate IR communication between the contact-required kiosk and the user device.

* * * * *